US00RE50294E

(19) United States
(12) Reissued Patent
Lee et al.

(10) Patent Number: US RE50,294 E
(45) Date of Reissued Patent: Feb. 11, 2025

(54) REFRIGERATOR AND METHOD FOR CONTROLLING THE SAME

(71) Applicant: LG Electronics Inc., Seoul (KR)

(72) Inventors: Eun Joo Lee, Gyeongsangnam-do (KR); Hang Bok Lee, Gyeongsangnam-do (KR)

(73) Assignee: LG Electronics Inc., Seoul (KR)

(21) Appl. No.: 17/675,332

(22) Filed: Feb. 18, 2022

Related U.S. Patent Documents

Reissue of:
(64) Patent No.: 10,568,440
Issued: Feb. 25, 2020
Appl. No.: 16/298,097
Filed: Mar. 11, 2019

U.S. Applications:
(63) Continuation of application No. 15/212,123, filed on Jul. 15, 2016, now Pat. No. 10,271,668, which is a (Continued)

(30) Foreign Application Priority Data

Feb. 1, 2010 (KR) ..... 10-2010-0008977
Feb. 1, 2010 (KR) ..... 10-2010-0008978

(51) Int. Cl.
*A47F 3/04* (2006.01)
*A47F 3/00* (2006.01)

(Continued)

(52) U.S. Cl.
CPC ..... *A47F 3/0434* (2013.01); *A47F 3/001* (2013.01); *A47F 3/005* (2013.01); *A47F 3/043* (2013.01);

(Continued)

(58) Field of Classification Search
CPC ..... A47F 3/0434; A47F 3/001; A47F 3/005; A47F 3/043; F25D 11/02; F25D 23/02;

(Continued)

(56) References Cited

U.S. PATENT DOCUMENTS 215,064 A 5/1879 Mathesius
1,275,511 A 8/1918 Welch (Continued)

FOREIGN PATENT DOCUMENTS

CN 1627016 6/2008
CN 101222866 7/2008

(Continued)

OTHER PUBLICATIONS

KR 10-1998-0052430 to Daewoo English translation (Year: 1998).*

(Continued)

*Primary Examiner* — Terrence R Till
(74) *Attorney, Agent, or Firm* — Fish & Richardson P.C.

(57) ABSTRACT

Provided is a refrigerator, which includes a refrigerating compartment, a freezing compartment, and a door assembly. The freezing compartment is adjacent to the refrigerating compartment. The door assembly selectively opens the refrigerating compartment and the freezing compartment. The door assembly includes a glass member defining a frontal exterior thereof and allowing an inside of the refrigerating compartment or the freezing compartment to be seen therethrough when the door assembly is closed, a deposition treated layer formed on a rear surface of the glass member to allow light to partially pass through the glass member, and a transparent plate spaced a predetermined distance from the glass member. Gas for insulation is injected in a space formed between the glass member and the transparent plate, and the space is sealed.

51 Claims, 11 Drawing Sheets

Related U.S. Application Data continuation of application No. 14/724,980, filed on May 29, 2015, now Pat. No. 9,510,696, which is a continuation of application No. 13/390,946, filed as application No. PCT/KR2011/000374 on Jan. 19, 2011, now Pat. No. 9,046,294.

(51) Int. Cl.

| | |
|---|---|
| ***F25D 11/02*** | (2006.01) |
| ***F25D 23/02*** | (2006.01) |
| ***F25D 23/04*** | (2006.01) |
| ***F25D 23/06*** | (2006.01) |
| ***F25D 25/02*** | (2006.01) |
| ***F25D 27/00*** | (2006.01) |

(52) U.S. Cl.

CPC ..... *F25D 11/02* (2013.01); *F25D 23/02* (2013.01); *F25D 23/025* (2013.01); *F25D 23/028* (2013.01); *F25D 23/04* (2013.01); *F25D 23/065* (2013.01); *F25D 27/00* (2013.01); *F25D 27/005* (2013.01); *F25D 25/025* (2013.01); *F25D 2201/14* (2013.01); *F25D 2323/021* (2013.01); *F25D 2323/023* (2013.01); *F25D 2400/18* (2013.01); *F25D 2400/36* (2013.01)

(58) Field of Classification Search

CPC ..... F25D 23/025; F25D 23/028; F25D 23/04; F25D 23/065; F25D 27/00; F25D 27/005; F25D 25/025; F25D 2201/14; F25D 2323/021; F25D 2323/023; F25D 2400/18; F25D 2400/36

See application file for complete search history.

(56) References Cited

U.S. PATENT DOCUMENTS

| | | | | |
|---|---|---|---|---|
| 1,927,398 | A | 9/1933 | Glasser | |
| 2,046,909 | A | 7/1936 | Terry et al. | |
| 2,051,132 | A | 8/1936 | Dart | |
| 2,095,811 | A | 10/1937 | Goulooze | |
| 2,112,771 | A | 3/1938 | Goulooze | |
| 2,122,680 | A | 7/1938 | Dart | |
| 2,129,923 | A | 9/1938 | Mortimer | |
| 2,130,617 | A | 9/1938 | Dockham | |
| 2,131,680 | A | 9/1938 | Zahodiakin | |
| 2,135,878 | A | 11/1938 | Sekyra | |
| 2,213,274 | A | 9/1940 | Flamm | |
| 2,276,937 | A | 3/1942 | Arturo | |
| 2,339,085 | A | 1/1944 | Luckiesh | |
| 2,381,598 | A | 8/1945 | Paul | |
| 2,453,387 | A | 11/1948 | Rundell | |
| 2,644,882 | A | 7/1953 | Voda | |
| 2,653,851 | A | 9/1953 | Davidson | |
| 2,692,813 | A | 10/1954 | Toronto | |
| 2,942,438 | A | 6/1960 | Schmeling | |
| 2,995,649 | A | 8/1961 | Cyrus | |
| 3,086,830 | A | 4/1963 | Peter | |
| 3,140,134 | A | 7/1964 | Nairn | |
| 3,218,111 | A | 11/1965 | Steiner | |
| 3,314,196 | A | 4/1967 | Betz et al. | |
| 3,389,424 | A | 6/1968 | Fellwock | |
| 3,510,986 | A | 5/1970 | Berkowitz | |
| 3,726,578 | A | 4/1973 | Armstrong | |
| 3,836,221 | A | 9/1974 | Whistler et al. | |
| 4,072,486 | A | 2/1978 | Joseph et al. | |
| 4,087,140 | A | 5/1978 | Linstromberg | |
| 4,302,907 | A | 12/1981 | Canals et al. | |
| 4,368,622 | A | 1/1983 | Brooks | |
| 4,514,021 | A | 4/1985 | Sundermeier et al. | |
| 4,893,902 | A | 1/1990 | Baughman et al. | |
| 5,048,233 | A | 9/1991 | Gidseg | |
| 5,111,618 | A | 5/1992 | Kaspar et al. | |
| 5,209,082 | A | 5/1993 | Ha | |
| 5,412,839 | A | 5/1995 | McCollom | |
| RE35,120 | E | 12/1995 | Heaney | |
| 5,486,044 | A | 1/1996 | Bennett | |
| 5,584,902 | A | 12/1996 | Hartig et al. | |
| 5,589,958 | A | 12/1996 | Lieb | |
| 5,600,966 | A | 2/1997 | Valence et al. | |
| 5,966,963 | A | 10/1999 | Kovalaske | |
| 6,055,823 | A | 5/2000 | Baker et al. | |
| 6,059,420 | A | 5/2000 | Rogers | |
| 6,193,340 | B1 | 2/2001 | Schenker | |
| 6,268,594 | B1 | 7/2001 | Leutner et al. | |
| 6,375,291 | B1 | 4/2002 | Nam et al. | |
| 6,406,108 | B1 | 6/2002 | Upton et al. | |
| 6,722,142 | B1 | 4/2004 | Pagel | |
| RE39,044 | E | 3/2006 | Ross | |
| 7,008,032 | B2 | 3/2006 | Chekal | |
| 7,337,628 | B2 | 3/2008 | Okuda et al. | |
| 7,360,374 | B2 | 4/2008 | Larose, Jr. | |
| 7,869,197 | B2 | 1/2011 | Lee | |
| 7,870,704 | B2 | 1/2011 | Riblier | |
| 7,891,154 | B2 | 2/2011 | Cording | |
| 7,976,916 | B2 | 7/2011 | Riblier | |
| 8,459,818 | B2 * | 6/2013 | Becke | F25D 27/00 362/92 |
| 9,046,294 | B2 * | 6/2015 | Lee | F25D 23/02 |
| 9,510,696 | B2 * | 12/2016 | Lee | F25D 23/02 |
| 10,271,668 | B2 * | 4/2019 | Lee | F25D 23/02 |
| 2004/0137235 | A1 | 7/2004 | Paul et al. | |
| 2005/0188506 | A1 | 9/2005 | Lee et al. | |
| 2005/0258724 | A1 | 11/2005 | Hwa | |
| 2006/0005484 | A1 | 1/2006 | Riblier et al. | |
| 2006/0118408 | A1 | 6/2006 | Myli | |
| 2006/0152123 | A1 | 7/2006 | Collins et al. | |
| 2006/0265979 | A1 | 11/2006 | Cording | |
| 2007/0018548 | A1 | 1/2007 | Ertz et al. | |
| 2007/0180842 | A1 | 8/2007 | Larose, Jr. | |
| 2008/0006042 | A1 | 1/2008 | Lee | |
| 2008/0047209 | A1 * | 2/2008 | Hinterholzer | A47F 3/0434 52/208 |
| 2008/0164788 | A1 | 7/2008 | Riblier | |
| 2008/0203874 | A1 | 8/2008 | Lim | |
| 2008/0238273 | A1 | 10/2008 | Lee et al. | |
| 2008/0247154 | A1 * | 10/2008 | Lim | F25D 27/00 362/92 |
| 2009/0044556 | A1 | 2/2009 | Ihle | |
| 2009/0075069 | A1 | 3/2009 | Myli | |
| 2009/0121970 | A1 | 5/2009 | Ozbek | |
| 2009/0134802 | A1 | 5/2009 | Oketani | |
| 2009/0224637 | A1 | 9/2009 | Moon et al. | |
| 2009/0244884 | A1 | 10/2009 | Trulaske, Sr. | |
| 2009/0272136 | A1 | 11/2009 | Knoll et al. | |
| 2009/0284157 | A1 | 11/2009 | Wetekamp | |
| 2010/0107679 | A1 | 5/2010 | Park et al. | |
| 2010/0308705 | A1 | 12/2010 | Kwon et al. | |
| 2010/0320890 | A1 | 12/2010 | Jung | |

FOREIGN PATENT DOCUMENTS

| | | | | |
|---|---|---|---|---|
| CN | 101277414 | | 10/2008 | |
| DE | 20-2005-002231 | | 6/2006 | |
| DE | 10-2005-057154 | | 5/2007 | |
| EP | 0 539 558 | | 12/1992 | |
| EP | 1 645 823 | | 4/2006 | |
| FR | 2881819 | | 8/2006 | |
| JP | 56-164495 | | 12/1981 | |
| JP | 63-142682 | | 9/1988 | |
| JP | 06-066473 | | 3/1994 | |
| JP | H0666473 | | 3/1994 | |
| JP | H 09-061045 | | 3/1997 | |
| JP | H0961045 | A * | 3/1997 | F25D 2400/18 |
| JP | 10-009757 | | 1/1998 | |
| JP | H109757 | | 1/1998 | |
| JP | 2000-065459 | | 3/2000 | |
| JP | 2000-241070 | | 9/2000 | |
| JP | 2001-108357 | | 4/2001 | |
| JP | 2001-280820 | | 10/2001 | |
| JP | 2001-280821 | | 10/2001 | |

(56) References Cited

FOREIGN PATENT DOCUMENTS

| | | | |
|---|---|---|---|
| JP | 2002-323287 | 11/2002 | |
| JP | 2004-211977 | 7/2004 | |
| JP | 2004-225968 | 8/2004 | ..... F25D 23/02 |
| JP | 2006-038437 | 2/2006 | |
| JP | 2009-103395 | 5/2009 | |
| JP | 2009-236366 | 10/2009 | |
| KR | 1990-0008203 | 9/1990 | |
| KR | 900008203 | 9/1990 | |
| KR | 1996-0011364 | 4/1996 | |
| KR | 960011364 | 5/1997 | |
| KR | 10-1998-0052430 | 10/1998 | |
| KR | 1999-042339 | 6/1999 | |
| KR | 19990042339 | 6/1999 | |
| KR | 1999-062159 | 7/1999 | |
| KR | 19990062159 | 7/1999 | |
| KR | 1999-037440 | 10/1999 | |
| KR | 19990037440 | 10/1999 | |
| KR | 1999-0039593 | 11/1999 | |
| KR | 20-0164322 | 2/2000 | |
| KR | 20-0168373 | 2/2000 | |
| KR | 10-2000-0034754 | 6/2000 | |
| KR | 20000034754 | 6/2000 | |
| KR | 10-2000-0037354 | 7/2000 | |
| KR | 20000037354 | 7/2000 | |
| KR | 10-2001-0037549 | 5/2001 | |
| KR | 20010037549 | 5/2001 | |
| KR | 10-2002-0080938 | 10/2002 | |
| KR | 20020080938 | 10/2002 | |
| KR | 2002-0083115 | 11/2002 | |
| KR | 10-0376167 | 3/2003 | |
| KR | 20-0314145 | 5/2003 | |
| KR | 10-2003-0083812 | 11/2003 | |
| KR | 2003-0083813 | 11/2003 | |
| KR | 20030083812 | 11/2003 | |
| KR | 2005-0111094 | 11/2005 | |
| KR | 10-0596533 | 7/2006 | |
| KR | 10-0733309 | 6/2007 | |
| KR | 10-2008-0065618 | 7/2008 | |
| KR | 20080065618 | 7/2008 | |
| KR | 10-2008-0108686 | 12/2008 | |
| KR | 20080108686 | 12/2008 | |
| KR | 10-0884946 | 2/2009 | |
| KR | 10-0887575 | 3/2009 | |
| KR | 2009-0077564 | 7/2009 | |
| WO | WO 1992/20981 | 10/1992 | |
| WO | WO 9220981 | 11/1992 | |
| WO | WO 2002/076901 | 10/2002 | |
| WO | WO 2004/059228 | 7/2004 | |
| WO | WO 2004/085771 | 10/2004 | |
| WO | WO 2006/034068 | 3/2006 | |
| WO | WO 2006/133998 | 12/2006 | |
| WO | WO 2007/035801 | 3/2007 | |
| WO | WO 2008/050986 | 5/2008 | |
| WO | WO 2009/061069 | 5/2009 | |
| WO | WO 2009/104858 | 8/2009 | |
| WO | WO 2009/104863 | 8/2009 | |
| WO | WO 2009/123417 | 10/2009 | |
| WO | WO2010063553 | 6/2010 | |
| WO | WO-2010063553 A1 * | 6/2010 | ..... F25D 27/00 |
| WO | WO 2010/131810 | 11/2010 | |
| WO | WO 2010/131813 | 11/2010 | |

OTHER PUBLICATIONS

Notice of Allowance issued in U.S. Appl. No. 14/724,980 on Aug. 3, 2016.
U.S. Office Action dated May 9, 2017, issued in U.S. Appl. No. 15/212,123.
U.S. Final Office Action dated Aug. 25, 2017, issued in U.S. Appl. No. 15/212,123.
U.S. Office Action dated Feb. 28, 2018, issued in U.S. Appl. No. 15/212,123.
U.S. Final Office Action dated Jul. 30, 2018, issued in U.S. Appl. No. 15/212,123.
United States Office Action dated Jun. 26, 2019 issued in co-pending related U.S. Appl. No. 16/298,145 (HI-1471.02).
United States Office Action dated Jun. 27, 2019 issued in co-pending related U.S. Appl. No. 16/298,119 (H1-1471.01).
Extended European Search Report in European Application No. 11737253.2, dated Mar. 15, 2018.
Extended European Search Report in European Application No. 17162812.6, dated Jul. 11, 2017 (with English translation).
Extended European Search Report in European Application No. 17162829.0, dated Jul. 13, 2017 (with English translation).
Extended European Search Report in European Application No. 17162819.1, dated Sep. 20, 2017 (with English translation).
European Communication pursuant to Rule 164(1) EPC in European Application No. 11737253.2, dated Nov. 10, 2017.
India Office Action in Indian Application No. 4514/KOLNP/2011, dated Mar. 17, 2017 (with English translation).
PCT International Search Report dated Jul. 28, 2011 for Application No. PCT/KR2011/000374.
Korean Notice of Allowance dated Aug. 6, 2013 for Application No. 10-2010-000897.
Russian Office Action dated Jul. 8, 2013 for Application No. 2011147478, with English Translation.
U.S. Office Action dated Mar. 29, 2013 for U.S. Appl. No. 13/391,632.
Korean Notice of Allowance dated Oct. 24, 2013 for Application No. 10-2010-000897.
Chinese Office Action dated Sep. 9, 2014 for Chinese Application No. 201180002636.4.
U.S. Office Action dated Oct. 29, 2013 for U.S. Appl. No. 13/391,632.
Notice of Allowance issued in U.S. Appl. No. 14/724,980 dated Aug. 3, 2016.

* cited by examiner

[Fig. 1]
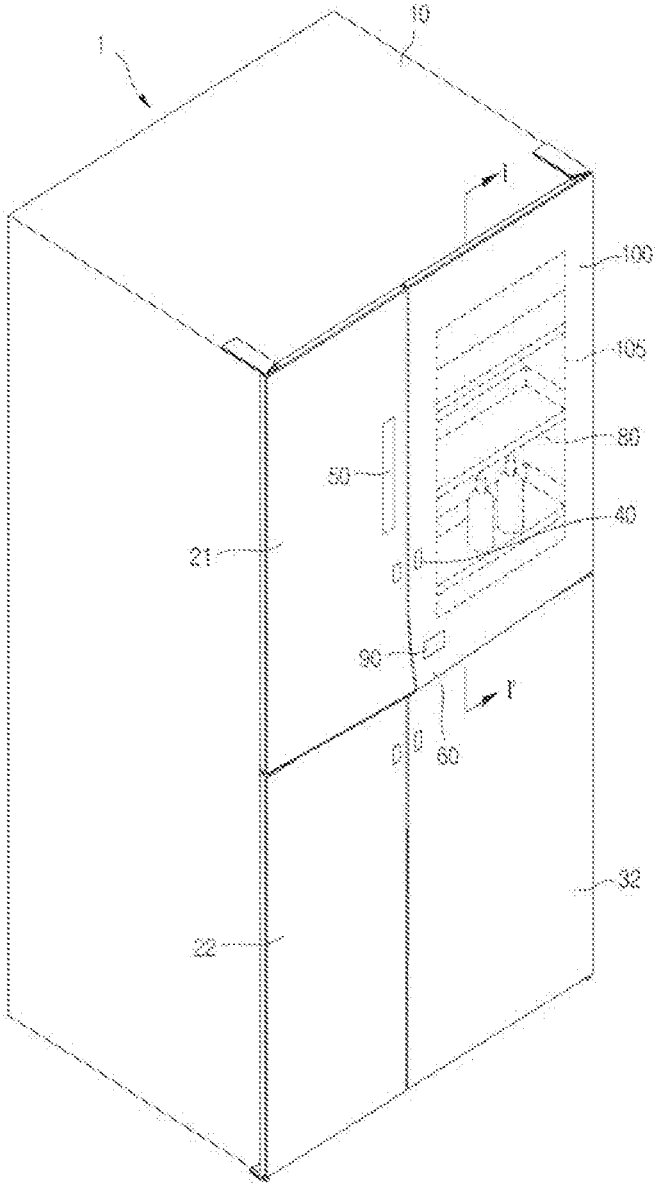

[Fig. 2]
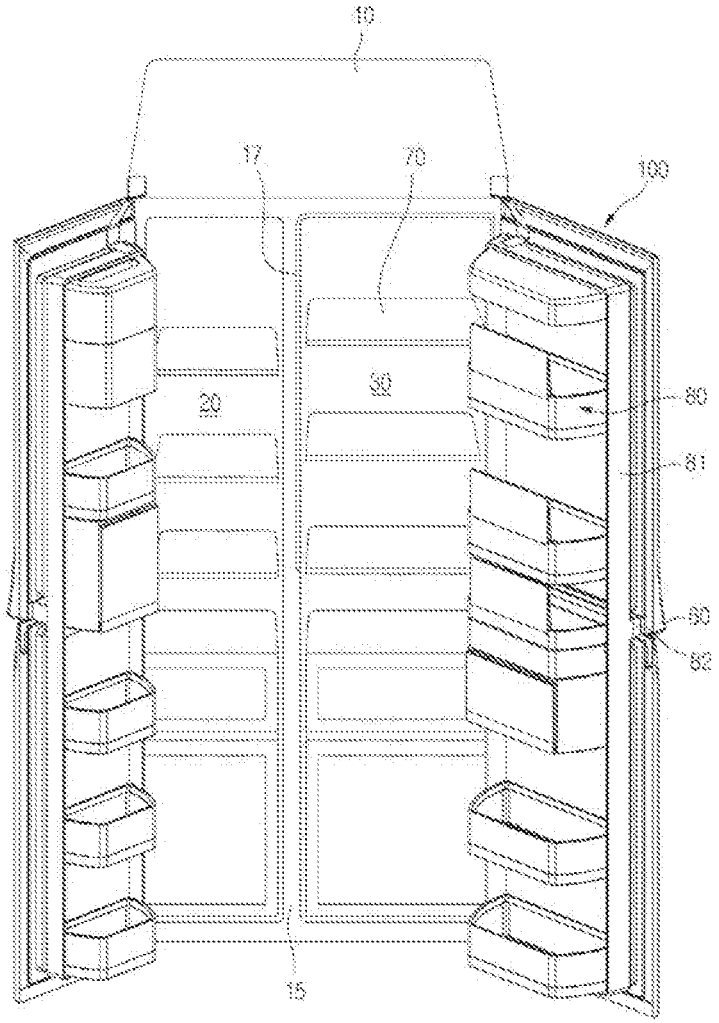

[Fig. 3]
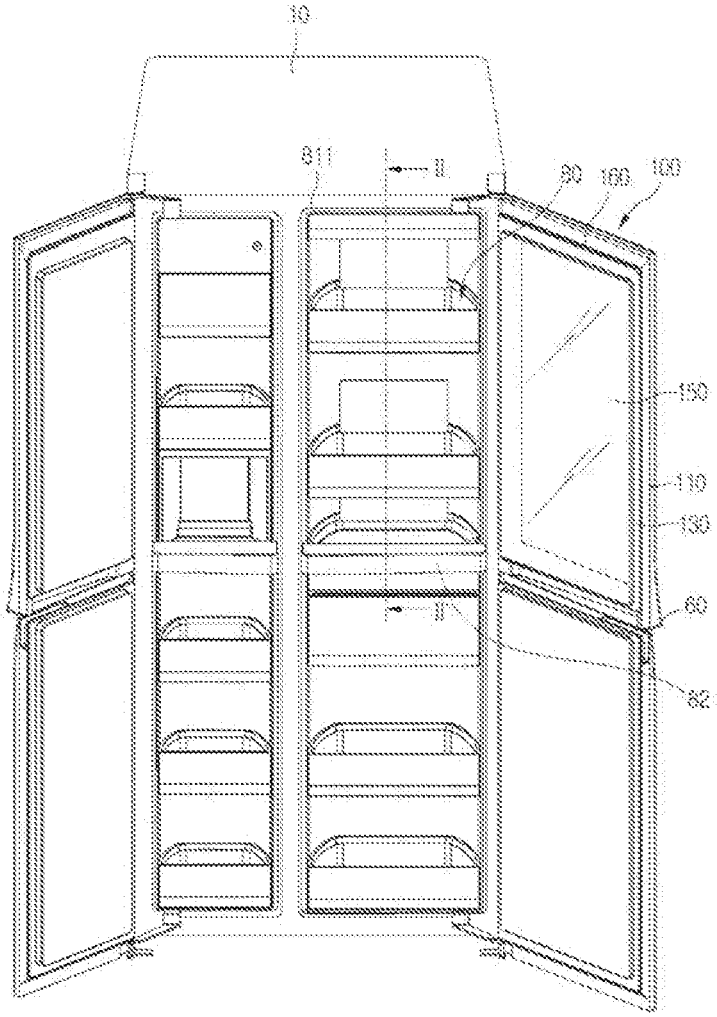

[Fig. 4]
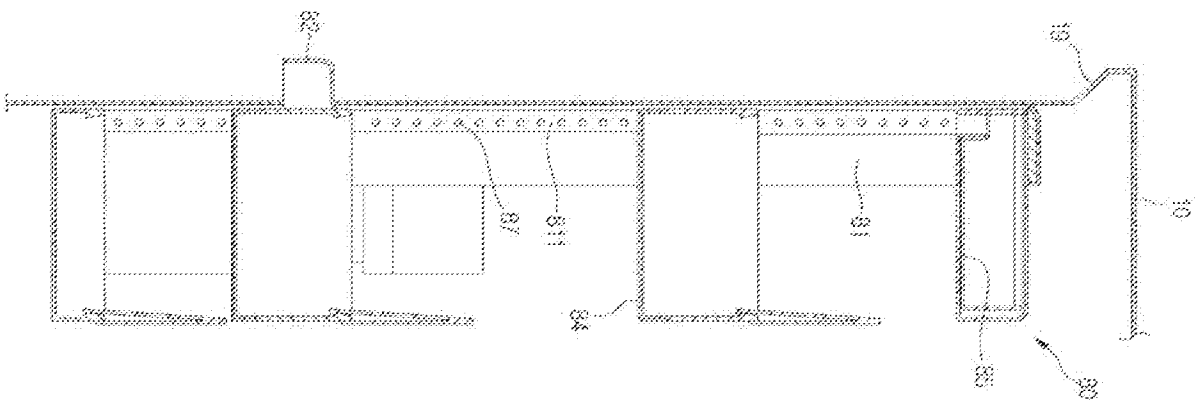

AMENDED
[Fig. 5]
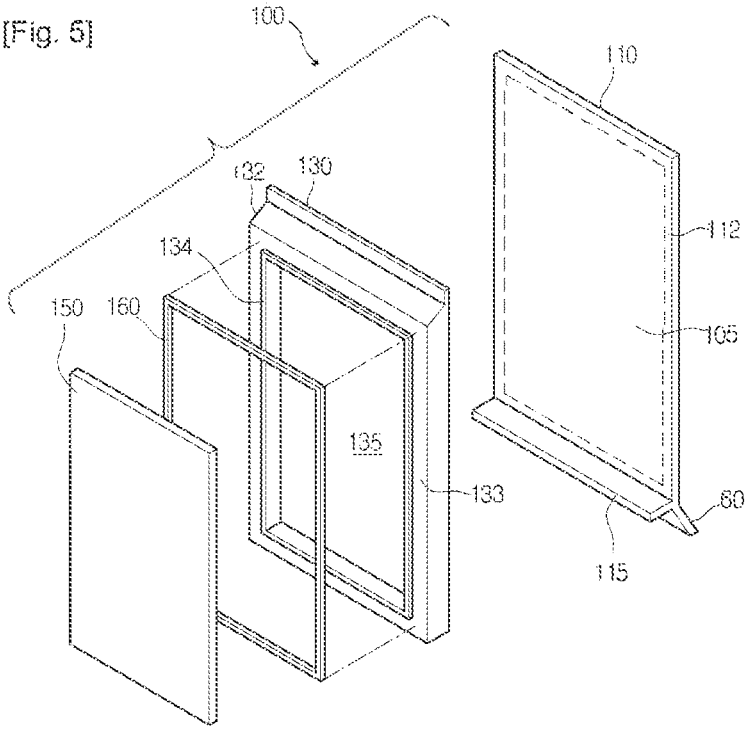
[Fig. 6]
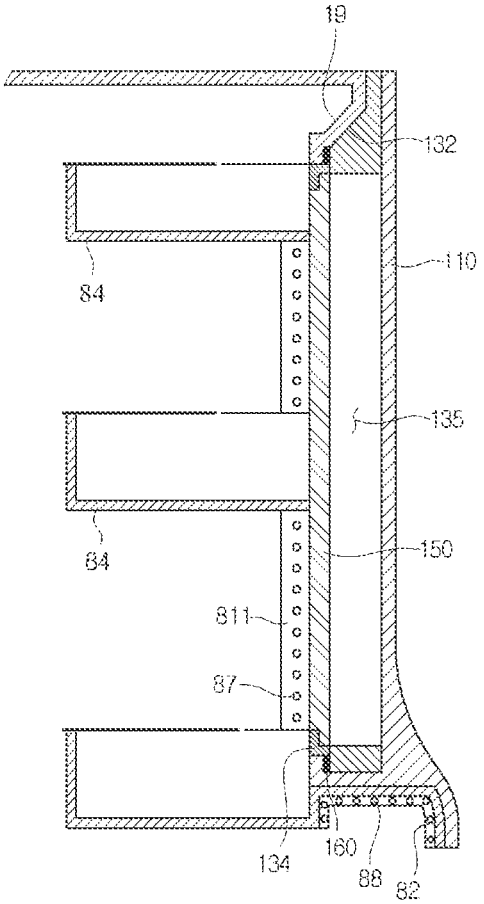

[Fig. 7]
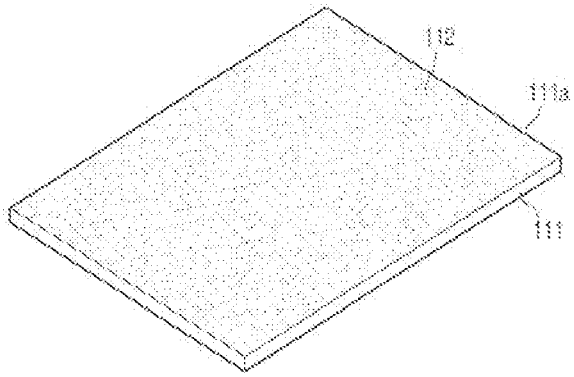
[Fig. 8]
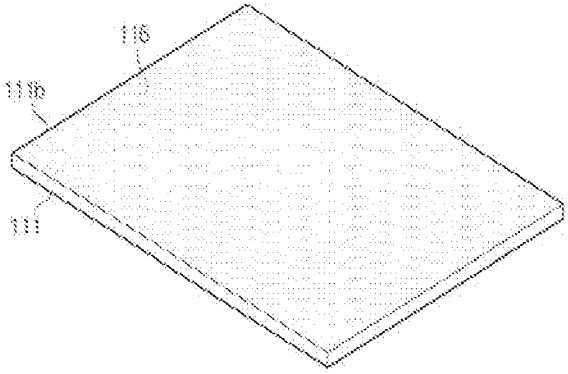
[Fig. 9]
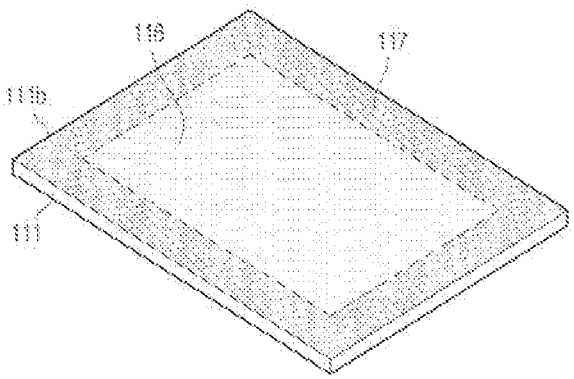
[Fig. 10]
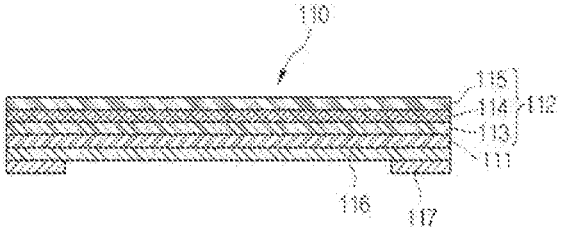

[Fig. 11]
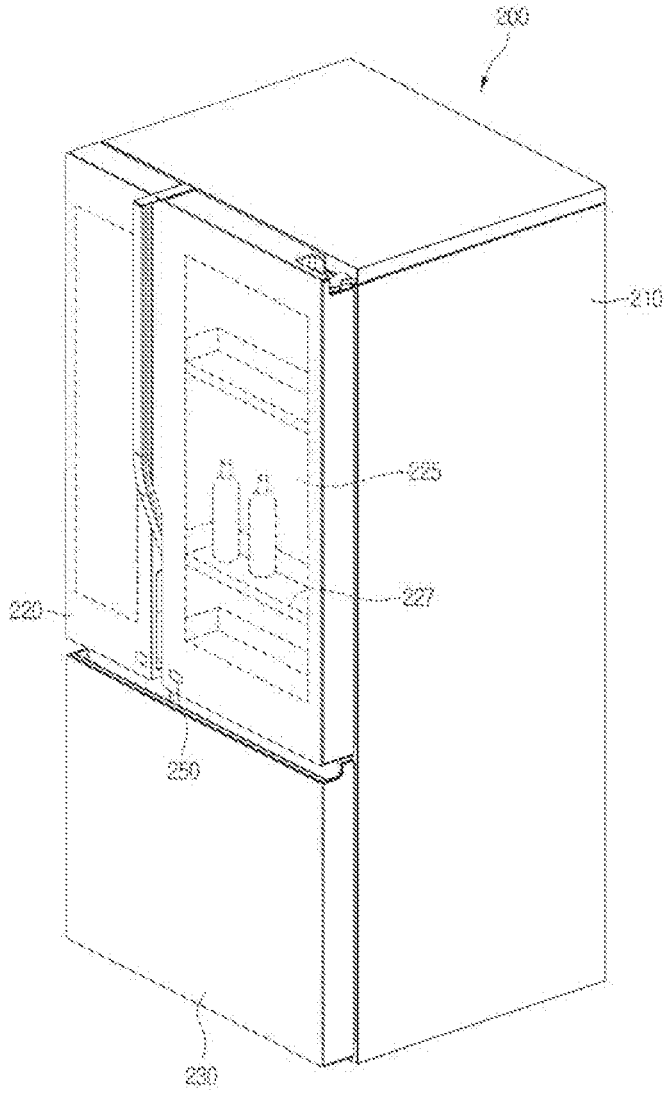

[Fig. 12]
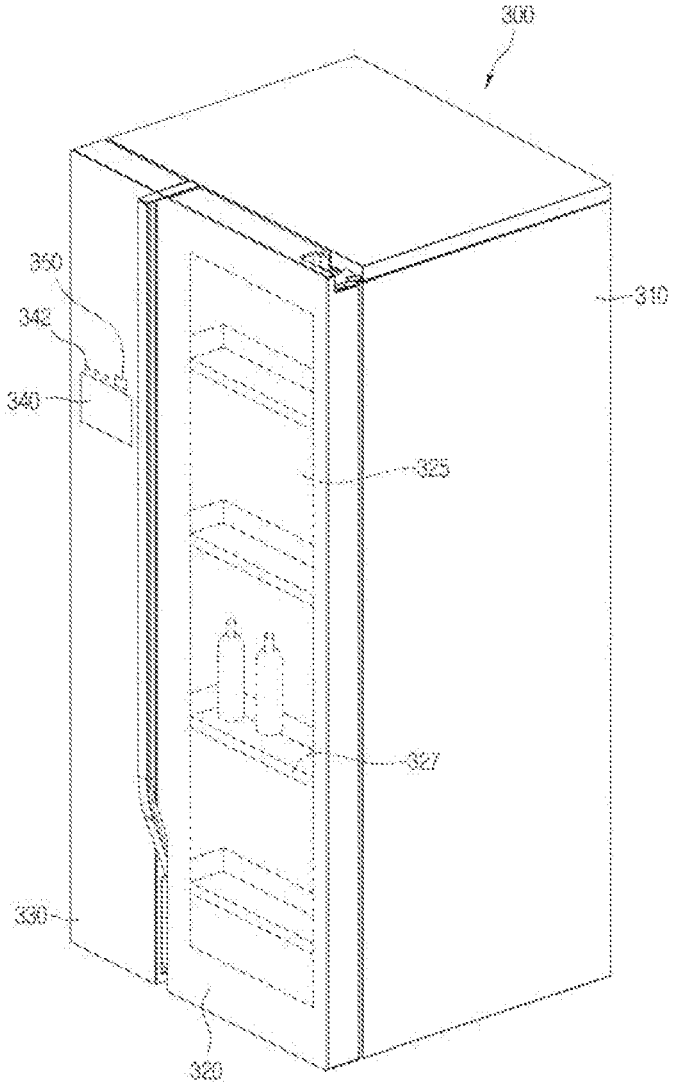

[Fig. 13]
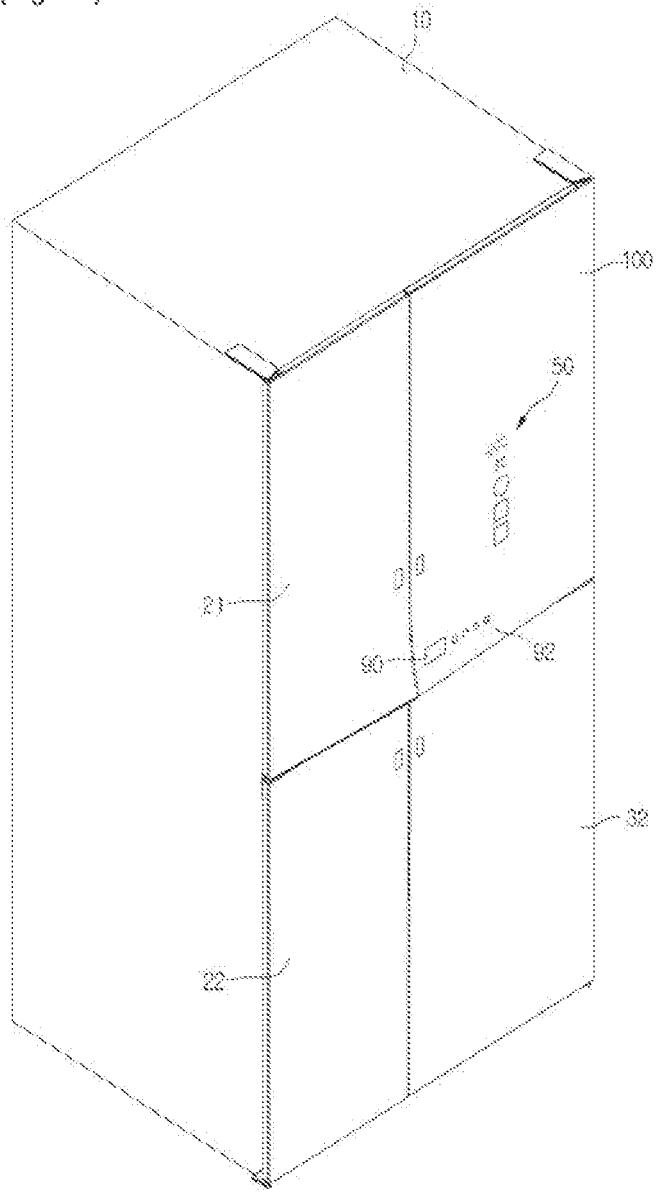
[Fig. 14]
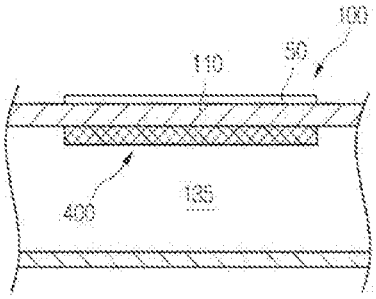

[Fig. 15]
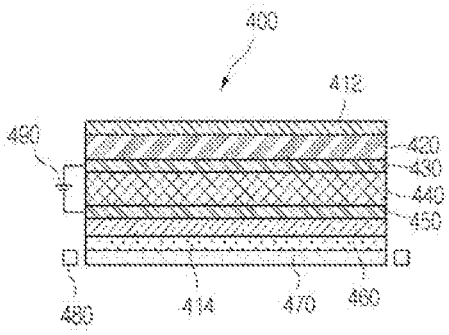
[Fig. 16]
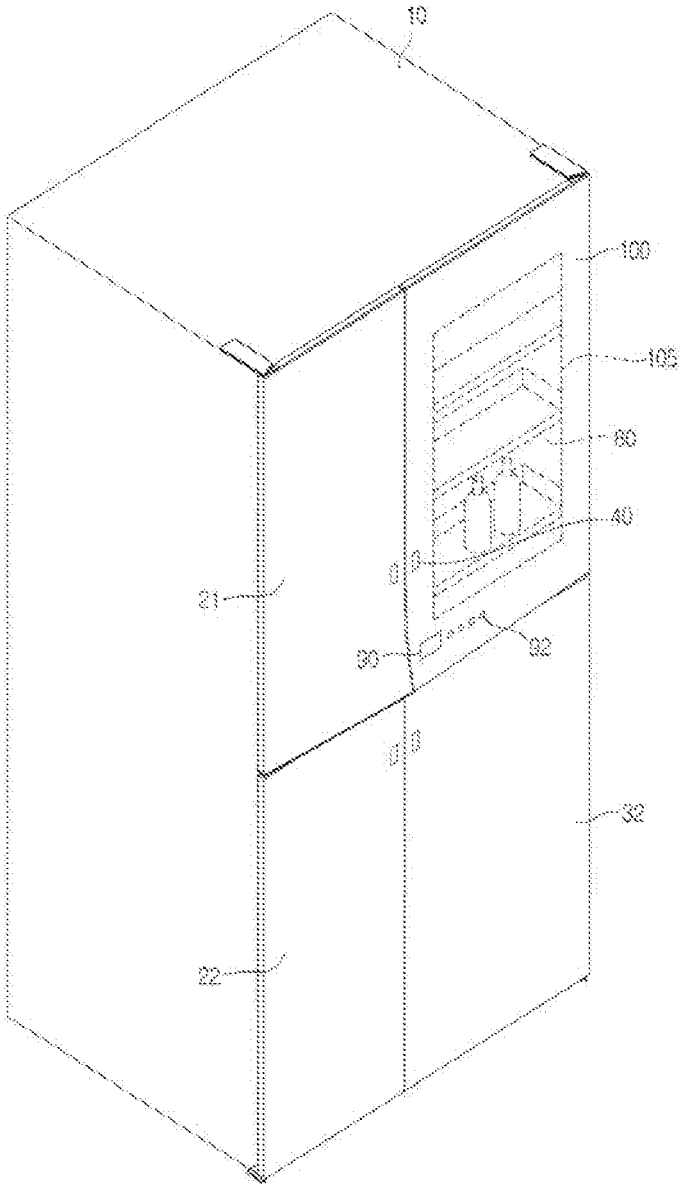

[Fig. 17]
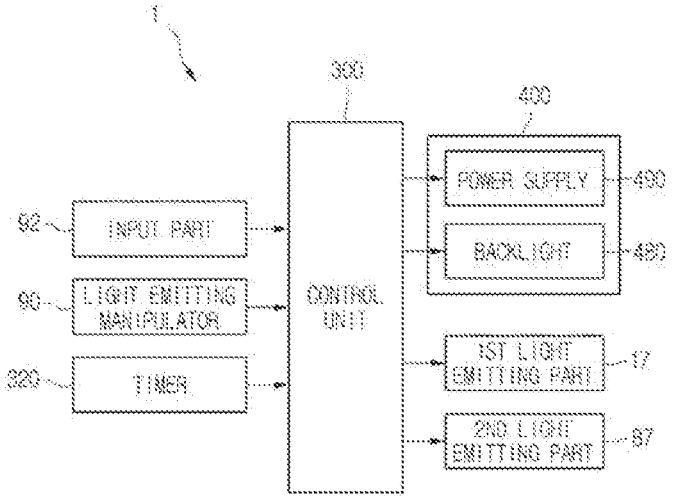
[Fig. 18]
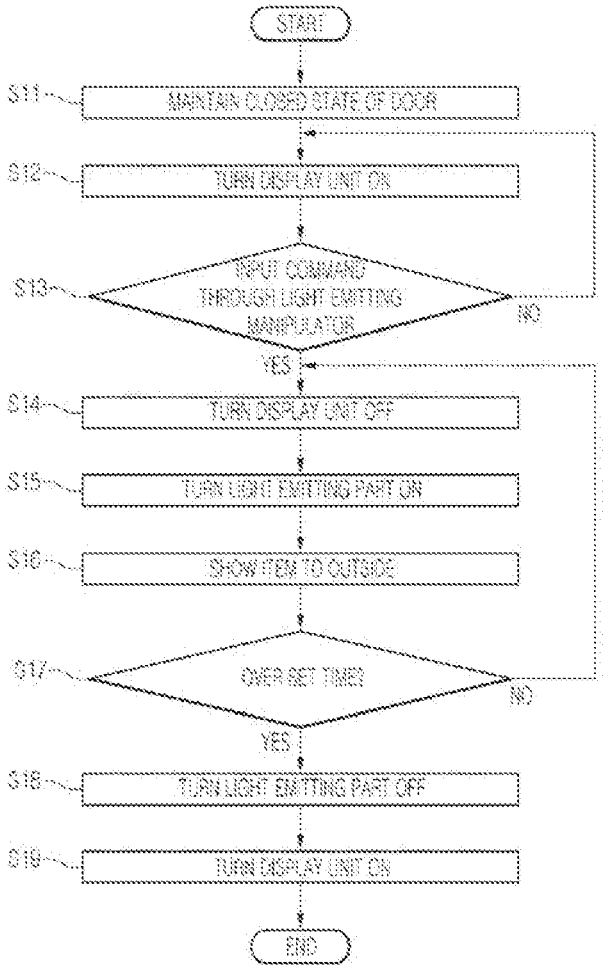

REFRIGERATOR AND METHOD FOR CONTROLLING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a *reissue of U.S. application Ser. No. 16/298,097, filed on Mar. 11, 2019, now U.S. Pat. No. 10,568,440, issued on Feb. 25, 2020, which is a* continuation of U.S. application Ser. No. 15/212,123, filed Jul. 15, 2016, which is a continuation of U.S. application Ser. No. 14/724,980, now U.S. Pat. No. 9,510,696, filed May 29, 2015, which is a continuation of U.S. application Ser. No. 13/390,946, filed Feb. 17, 2012, now U.S. Pat. No. 9,046,294, which is a U.S. National Phase Application of International Application PCT/KR2011/000374, filed on Jan. 19, 2011, which claims the benefit of Korean Application Nos. 10-2010-0008977 and 10-2010-0008978, filed on Feb. 1, 2010, the entire contents of which are hereby incorporated by reference in their entireties.

TECHNICAL FIELD

The present disclosure relates to a refrigerator and a method for controlling the refrigerator.

BACKGROUND ART

Refrigerators repeatedly perform a refrigerating cycle to cool a refrigerating compartment or freezing compartment, so that foods can be freshly stored therein for a predetermined time.

Such a refrigerator includes a main body defining a storage space, and a door selectively opening or closing the main body. An item is stored in the storage space, and the door can be opened to take out the stored item.

Since the main body is covered with the door, it is difficult to figure out the position of an item to be taken out until opening the door.

Thus, the door should be opened to figure out the position of an item. At this point, cool air may flow out from the storage space.

Accordingly, the temperature of the storage space may increase, items stored in the refrigerator may be degraded, and power consumption for cooling the storage space may be increased.

DISCLOSURE OF INVENTION

Technical Problem

Embodiments provide a refrigerator and a method for controlling the refrigerator, which make it possible to see through the refrigerator from the outside.

Embodiments also provide a refrigerator and a method for controlling the refrigerator, which make it possible to perceive an item stored in the refrigerator by operating a light emitting part when a refrigerator door is closed.

Embodiments also provide a refrigerator and a method for controlling the refrigerator, which make it possible to selectively drive a viewing window and a display unit for displaying an operation state of the refrigerator.

Solution to Problem

In one embodiment, a refrigerator includes: a refrigerating compartment; a freezing compartment adjacent to the refrigerating compartment; and a door assembly selectively opening or closing each the refrigerating compartment and the freezing compartment, wherein the door assembly includes: a glass member defining a frontal exterior thereof and allowing an inside of the refrigerating compartment or the freezing compartment to be seen therethrough when the door assembly is closed; a deposition treated layer formed on a rear surface of the glass member to allow light to partially pass through the glass member; and a transparent plate spaced a predetermined distance from the glass member, wherein gas for insulation is injected in a space formed between the glass member and the transparent plate, and the space is sealed.

In another embodiment, a refrigerator includes: a main body defining a storage compartment; a light emitting part configured to emit light to the storage compartment; and a door selectively opening or closing the storage compartment, wherein the door includes: an inner door part allowing the light from the light emitting part to pass therethrough; an outer door part allowing the light passing through the inner door part to selectively pass therethrough; and a gas layer for insulation which fills a space between the inner door part and the outer door part, wherein, when the light emitting part is turned on and the door is closed, an item inside the storage compartment is perceived from a frontal viewing of the door.

In another embodiment, a refrigerator includes: a main body having a storage compartment for storing food stuff; a light emitting part configured to emit light to the storage compartment; a door opening or closing the storage compartment, the door having a viewing window allowing the light from the light emitting part to be released outwards; a display unit disposed on the door to display information regarding performance of the refrigerator; a viewing conversion input switch configured to input a command for operating the light emitting part and the display unit; and a control unit configured to turn the light emitting part on and stop the display unit from displaying the information, according to a signal from the viewing conversion input switch.

In another embodiment, a method for controlling a refrigerator comprising a main body having a storage compartment, a light emitting part illuminating the storage compartment, and a door selectively opening or closing the storage compartment includes: displaying preset information through a display unit disposed on the door; inputting a view converting command through a viewing conversion input switch disposed on the door; emitting light by operating the light emitting part according to the view converting command; and allowing the light emitted from the light emitting part to pass through a viewing window disposed on the door, such that food stuff within the storage compartment be seen through the viewing window from an outside of the refrigerator.

The details of one or more embodiments are set forth in the accompanying drawings and the description below.

Other features will be apparent from the description and drawings, and from the claims.

Advantageous Effects of Invention

According to the embodiment, since the deposition-treated glass member is provided to the refrigerator door to show the storage space to the outside, a stored item to be taken out can be perceived without opening the refrigerator door.

In addition, since the refrigerator includes the light emitting part to illuminate the storage space, the position of an item can be easily checked. Also, since the light emitting part can be selectively operated, user convenience can be improved and power consumption can be reduced.

In addition, since the refrigerator door includes the glass member and the transparent plate, and the insulating gas layer is disposed between the glass member and the transparent plate, the inside of the refrigerator can be seen through the refrigerator door from the outside, and the insulating performance of the refrigerator door can be ensured.

In addition, the display unit for displaying an operation state of the refrigerator is provided to the refrigerator door, and selectively disappears such that an item stored in the storage compartment can be perceived through the viewing window, and further, the light emitting part emits light, thereby improving user convenience.

BRIEF DESCRIPTION OF DRAWINGS

FIG. 1 is a perspective view illustrating a refrigerator according to a first embodiment.

FIG. 2 is a schematic view illustrating an open state of a door coupled a second receiving part, according to the first embodiment.

FIG. 3 is a schematic view illustrating an open state of the door without the second receiving part according to the first embodiment.

FIG. 4 is a cross-sectional view taken along line II-II' of FIG. 3.

FIG. 5 is an exploded perspective view illustrating a first refrigerating compartment door according to the first embodiment.

FIG. 6 is a cross-sectional view taken along line I-I' of FIG. 1.

FIGS. 7 to 9 are schematic views illustrating a process that is performed on an outer door part according to the first embodiment.

FIG. 10 is a cross-sectional view illustrating a configuration of an outer door part according to the first embodiment.

FIG. 11 is a perspective view illustrating a configuration of a refrigerator according to a second embodiment.

FIG. 12 is a perspective view illustrating a configuration of a refrigerator according to a third embodiment.

FIG. 13 is a perspective view illustrating a refrigerator according to a fourth embodiment.

FIGS. 14 and 15 are cross-sectional views illustrating a driving unit for driving a display unit of a refrigerator according to the fourth embodiment.

FIG. 16 is a perspective view illustrating an operation of a viewing window of the refrigerator according to the fourth embodiment.

FIG. 17 is a block diagram illustrating a configuration of a refrigerator according to an embodiment.

FIG. 18 is a flowchart illustrating a method for controlling a refrigerator according to an embodiment.

MODE FOR THE INVENTION

Reference will now be made in detail to the embodiments of the present disclosure, examples of which are illustrated in the accompanying drawings.

FIG. 1 is a perspective view illustrating a refrigerator according to a first embodiment. FIG. 2 is a schematic view illustrating an open state of a door coupled with a second receiving part, according to the first embodiment. FIG. 3 is a schematic view illustrating an open state of the door without the second receiving part according to the first embodiment. FIG. 4 is a cross-sectional view taken along line II-II' of FIG. 3.

Referring to FIGS. 1 to 4, a refrigerator 1 according to an embodiment includes a main body 10 (*i.e., cabinet*) that defines a freezing compartment 20 and a refrigerating compartment 30 as storage spaces. The freezing compartment 20 and the refrigerating compartment 30 are separated from each other by a partition 15, and are laterally arrayed in parallel. A first receiving part 70 for receiving items is disposed in the freezing compartment 20 and the refrigerating compartment 30. The first receiving part 70 includes a shelf.

A first light emitting part 17 that emits light to the first receiving part 70 is disposed at the frontal edge portion of the main body 10. The first light emitting part 17 may be disposed around the frontal edge portion of the freezing compartment 20 and the refrigerating compartment 30, and may include a light emitting diode (LED).

Compartment doors are rotatably disposed on the front surface of the main body 10 to selectively close the freezing compartment 20 and the refrigerating compartment 30.

The compartment doors include a first freezing compartment door 21 and a second freezing compartment door 22, which close the freezing compartment 20. The second freezing compartment door 22 may be disposed under the first freezing compartment door 21. The compartment door further includes a first refrigerating compartment door 100 and a second refrigerating compartment door 32, which close the refrigerating compartment 30. The second refrigerating compartment door 32 may be disposed under the first refrigerating compartment door 100.

Pressable opening-manipulators 40 may be disposed on the front surfaces of the freezing compartment doors 21 and 22 and the refrigerating compartment doors 32 and 100 to open the freezing compartment doors 21 and 22 and the refrigerating compartment doors 32 and 100. The front end of the main body 10 may be provided with opening mechanisms (not shown) that move in conjunction with the opening-manipulators 40.

When the opening-manipulator 40 is manipulated, the opening mechanism moves a corresponding one of the doors 21, 22, 32 and 100 forward to open at least one portion of the freezing compartment 20 or the refrigerating compartment 30.

A display unit 50 may be disposed on the first freezing compartment door 21 to display an operation state of the refrigerator 1 to the outside thereof. The display unit 50 may include input parts (not shown) to control an operation state of the refrigerator 1.

A viewing window 105 may be disposed on the first refrigerating compartment door 100 to see the inside of the refrigerating compartment 30 from the outside thereof. The viewing window 105 may constitute at least one portion of the front surface of the first refrigerating compartment door 100.

The first refrigerating compartment door 100 may be provided with a light emitting manipulator 90 that turns the first light emitting part 17 on. The light emitting manipulator 90 includes a button-type or touch-type input part.

Sub-doors for receiving an item may be disposed behind the doors 21, 22, 100, and 32. The sub-doors include a sub-door provided to the freezing compartment 20 and a sub-door 80 provided to the refrigerating compartment 30, which may be rotatably connected to the front portions of the freezing compartment 20 and the refrigerating compartment 30, and may have a length corresponding to the length of the freezing compartment 20 and the length of the refrigerating compartment 30. Hereinafter, the sub-doors are described with respect to the sub-door 80 provided to the refrigerating compartment 30, and the sub-door provided to the freezing compartment 20 may also be denoted by 80.

In detail, the sub-door 80 may include a frame 81 having a size to be received in the freezing compartment 20 or the refrigerating compartment 30, a sub-door handle 82 protruding from the front surface of the frame 81, and second receiving parts. The frame 81 is tetragonal in which the second receiving part may be removably mounted. The sub-door handle 82 may horizontally extend on the front surface of the frame 81.

The sub-door 80 may be removed from the freezing compartment doors 21 and 22 or the refrigerating compartment doors 32 and 100, and be disposed within the main body 10. That is, the sub-door 80 may be removed from the freezing compartment 20 or the refrigerating compartment 30 by rotating together with the freezing compartment doors 21 and 22 or the refrigerating compartment doors 32 and 100, or be disposed in the main body 10 when the freezing compartment doors 21 and 22 or the refrigerating compartment doors 32 and 100 are opened.

The first refrigerating compartment door 100 and the first freezing compartment door 21 are provided with a door handle 60 that can be held to open the first refrigerating compartment door 100.

The sub-door handle 82 is disposed behind the door handle 60, and may have a shape corresponding to the door handle 60. A third light emitting part 88 may be disposed within the sub-door handle 82. The third light emitting part 88 emits light to show the sub-door handle 82 in a dark indoor space. As described above, the sub-door handle 82 protrudes front approximately the central portion of the front surface of the sub-door 80, and may be integrally formed with the sub-door 80. A recess part may be recessed a predetermined depth upward from the bottom surface of the sub-door handle 82 to easily hold the sub-door handle 82. The front surface of the sub-door handle 82 is covered with the first refrigerating compartment door 100 and the first freezing compartment door 21, and thus, cannot be seen from the outside of the refrigerator 1. The recess part of the sub-door handle 82 can be held through a space formed between the first and second refrigerating compartment door 100 and 32 and a space formed between the first and second freezing compartment door 21 and 22.

As a result, when one of the opening-manipulators 40 is manipulated, only a corresponding one of the doors 21, 22, 100, and 32 can be opened. In the state where the doors 21, 22, 100, and 32 are closed, when the sub-door handle 82 is pulled out, the doors 21, 22, 100, and 32 and the sub-door 80 are simultaneously opened. For example, in the state where the first and second refrigerating compartment doors 100 and 32 are closed, when the sub-door handle 82 is pulled out, the first and second refrigerating compartment doors 100 and 32 and the sub-door 80 are simultaneously opened. The first and second freezing compartment doors 21 and 22 are opened in the same manner as those of the first and second refrigerating compartment doors 100 and 32. The second receiving parts of the sub-door 80 may include a receiving basket 84 and a receiving drawer part 85 to receive items. When only the first and second refrigerating compartment doors 100 and 32 are opened, the receiving drawer part 85 can be pulled forward.

The sub-door 80 includes a frontal edge portion 811 that constitutes a front border of the frame 81 when the sub-door 80 is disposed in the main body 10. The frontal edge portion 811 may be in close contact with the rear surfaces of the first and second refrigerating compartment doors 100 and 32 when the first and second refrigerating compartment doors 100 and 32 are closed.

The inner surface of the frontal edge portion 811 may be provided with a second light emitting part 87 that emits light to the center of the sub-door 80. The second light emitting part 87 may include an LED, and be operated by manipulating the light emitting manipulator 90.

When the second light emitting part 87 is turned on, an item stored in the sub-door 80 can be seen from the outside through the viewing window 105. In detail, when the light emitting manipulator 90 is manipulated, the first light emitting part 17 and the second light emitting part 87 are turned on at the same time, which may be maintained for a preset time. When the first and second light emitting parts 17 operate, items stored in the first receiving part 70 and the sub-door 80 can be seen from the outside through the viewing window 105.

FIG. 5 is an exploded perspective view illustrating a first refrigerating compartment door according to the first embodiment. FIG. 6 is a cross-sectional view taken along line I-I' of FIG. 1.

Referring to FIGS. 5 and 6, the first refrigerating compartment door 100 according to the first embodiment includes an outer door part 110 defining an exterior of the first refrigerating compartment door 100, an inner door part 150 spaced rearward from the outer door part 110, and a door body 130 coupling the outer door part 110 and the inner door part 150 to each other. A border of the inner door part 150 is provided with a sealing member 160 that seals the space between the first refrigerating compartment door 100 and the sub-door 80.

In detail, the outer door part 110 is provided with the viewing window 105 through which the inside of the refrigerator 1 can be seen from the outside. To this end, the outer door part 110 may be formed of transparent glass.

Further, a specific lamination or deposition process may be performed on the transparent glass, which will be described later with reference to drawings.

The rear surface of the outer door part 110 is provided with a coupling surface 112 for coupling to the door body 130. The coupling surface 112 has a certain area along a border of the door body 130.

The front surface of the door body 130 may be coupled to the coupling surface 112 using heat welding or supersonic welding. However, the present disclosure is not limited thereto, and thus, the door body 130 may be coupled to the outer door part 110 by a separate coupling member.

The lower portion of the outer door part 110 is provided with a support 115 that supports the lower portion of the door body 130. The support 115 extends to the rear side of the outer door part 110.

The door body 130 includes an insulating space 135 that has a hollow rectangle shape and functions as an insulating part for insulating the refrigerating compartment 30. The front portion of the insulating space 135 is covered by the outer door part 110. As described above, the outer door part 110 may be coupled to the front surface of the door body 130.

The rear portion of the insulating space 135 is covered by the inner door part 150. The door body 130 includes a support rib 134 that supports the inner door part 150.

The support rib 134 protrudes rearward around the insulating space 135. The inner door part 150 coupled to the rear portion of the door body 130 may be supported by at least one portion of the support rib 134. At this point, the inner door part 150 may be adhered to the support rib 134. In this case, the support rib 134 functions as a coupling rib.

As a result, the insulating space 135 has a thickness corresponding to the thickness of the door body 130.

When the outer door part 110 and the inner door part 150 are coupled to the front and rear portions of the door body 130, an insulating gas layer may be formed in the insulating space 135. The insulating gas layer may include at least one of air, argon (Ar), and krypton (Kr), which have high insulating performance.

The insulating space 135 may be maintained in a vacuum state. In this case, the insulating space 135 has no heat exchange medium, and thus, a heat exchange between the refrigerating compartment 30 and the outside can be minimized.

A sealing coupling part 133, which is coupled with the sealing member 160, is disposed outside the support rib 134. The sealing member 160 is coupled to the sealing coupling part 133 to prevent a leakage of cool air through the space between the first refrigerating compartment door 100 and the sub-door 80.

The door body 130 is provided with a door shoulder 132 that closely contacts the main body 10 when the first refrigerating compartment door 100 is closed on the main body 10. The door shoulder 132 mates with a main shoulder 19 (refer to FIG. 4), and is inclined in a certain direction.

Although not shown, a sealing member may be disposed between the door shoulder 132 and the main shoulder 19.

The inner door part 150 may include a transparent material to show the inside of the refrigerating compartment 30. For example, the inner door part 150 may include a transparent plate that is formed of glass or plastic to fully transmit light.

FIGS. 7 to 9 are schematic views illustrating a process that is performed on an outer door part according to the first embodiment. FIG. 10 is a cross-sectional view illustrating a configuration of an outer door part according to the first embodiment.

Referring to FIGS. 7 to 10, a treatment (process) for a glass member will now be described according to the first embodiment.

First, a lamination process is performed on a glass member 111 that is a principal part of the outer door part 110. The glass member 111 may be formed of a transparent material. Here, the transparent material may be defined as a material capable of fully transmitting light.

*Referring to FIGS. 1, 5, 11, 12, and 16, the transparent material of the outer door part may extend from a left edge of the door to a right edge of the door, and from a bottom edge of the door to a top edge of the door.*

Through the lamination process, a lamination treated layer 112 may be formed on a front surface 111a constituting the front surface of the glass member 111. The lamination treated layer 112 may be formed through a glass lamination process.

The glass lamination process is a method for expressing various feelings according to lighting or a viewing angle, in which glass ink is applied on the glass member 111 and then is heated at a temperature ranging from about 600.degree. C. to about 700.degree. C. such that the glass ink soaks in the glass member 111.

In detail, the lamination treated layer 112 includes a lamination layer 113, a reflective lamination layer 114, and a protective coating part 115. The lamination layer 113 may be printed using a silk screen lamination method, the so-called screen process. The silk screen lamination method makes it possible to freely express various colors and use various base materials, and is not limited in size and material. In the current embodiment, the front surface 111a of the glass member 111 may be colored silver or blue.

The reflective lamination layer 114 is disposed on the upper side of the lamination layer 113 such that a color printed on the lamination layer 113 is displayed through the glass member 111 without a distortion. That is, the reflective lamination layer 114 is configured to increase the color reflectivity of light passing through the lamination layer 113. The reflective lamination layer 114 and the lamination layer 113 may reduce the transparency of the glass member 111. The reflective lamination layer 114 has a thickness ranging from about 10.mu.m to about 40.mu.m to reflect most of light passing through the lamination layer 113. When the reflectivity of light is improved, the intensity of the light reflected through the lamination layer 113 increases, and thus, a color of the lamination layer 113 is more vivid. A gradation effect of the glass member 111 can be attained using the reflective lamination layer 114.

The protective coating part 115 may be formed of epoxy resin to protect the lamination layer 113 and the reflective lamination layer 114. The protective coating part 115 may be formed through laminating on the upper portion of the reflection lamination layer 114.

The lamination treated layer 112 configured as described above has a predetermined color to screen the transparent glass member 111 to a predetermined extent, and thus, a predetermined pattern is formed on the glass member 111.

Here, the term 'screen' denotes making the glass member 111 opaque to a predetermined extent.

After the lamination treated layer 112 is formed on the glass member 111, a deposition process is performed on a rear surface 111b of the glass member 111. Through the deposition process, a deposition treated layer 116 is formed on the rear surface 111b. The term 'deposition treated' denotes processing an uneven surface of the glass member 111 to form an even (smooth) surface, and coloring a surface of the glass member 111. Since the deposition treated layer 116 is disposed on the glass member 111, a portion of light can be emitted from the inside of the refrigerating compartment 30 to the outside.

In detail, the deposition treated layer 116 may be formed through an evaporation process. In the evaporation process, a metal source is heated, melted, and evaporated at a high temperature to be deposited on a base material (a wafer), that is, on the glass member 111. The evaporation process uses a principle that, when a metal is heated and evaporated at a high temperature for a short time, metal particles come out from the evaporated metal and are attached to a surface of a low temperature base material to form a thin metal film thereon. An electron beam may be used as an evaporating member in the evaporation process. A multi layer of a metal or metal oxide is heated, melted, and evaporated by the electron beam to form a film on a surface of a base material. Since the metal oxidizes at high temperature in the evaporation process, the evaporation process is performed in a vacuum state, and thus, may be called a vacuum evaporation process.

Accordingly, when the deposition treated layer 116 is formed on the glass member 111, an uneven surface of the glass member 111 is changed to a smooth surface, and thus, the outer door part 110 looks more luxurious.

The metal or metal oxide may include SiO.sub.2 or TiO.sub.2.

When SiO.sub.2 is used as a source material to be deposited on the glass member 111, the glass member 111 may be colored approximately in blue. When TiO.sub.2 is used as a source material to be deposited on the glass member 111, the glass member 110 may be colored approximately in silver. As described above, when SiO.sub.2 or TiO.sub.2 is used as a source material to be deposited on the glass member 111, the glass member 111 can be variously colored, and thus, the outer door part 110 can have a fancy color.

In addition, direct glare of light emitted from the first light emitting part 17 and the second light emitting part 87 can be prevented. That is, since the transparency of the glass member 111 is decreased (increase of opacity), light emitted from the first light emitting part 17 and the second light emitting part 87 is perceived as soft light from the outside. Through the evaporation process, the glass member 111 is improved in hardness and corrosion resistance, and is more resistant to temperature and humidity variations. Although the rear surface 111b of the outer door part 110 is exposed to gas in the insulating space 135 for a long time, discoloration or decoloration thereof can be prevented.

Alternatively, a sputtering process may be used as a depositing process for the glass member 111. In the sputtering process, plasma is formed by a high voltage generated from a voltage generating device such that plasma ions collide with a target to attach metal atoms to a base material, that is, to a surface of the glass member 111, thereby forming a metal film. In detail, argon (AN+) gas may be used to form the plasma ions, and stannum (Sn) may be used as the target. Thus, when the argon gas is ionized by a high voltage and collides with the stannum, particles coming out from the stannum are attached to the glass member 111 to form a metal film. Alternatively, aluminum (Al) may be used as the target. In this case, the argon gas collides with the aluminum, and particles coming out from the aluminum are attached to the glass member 111 to form a metal film.

After the deposition treated layer 116 is formed on the rear surface 111b, a screening layer 117 is formed on a border of the rear surface 111b. The screening layer 117 may be formed through the above-described lamination process, and may further make the glass member 111 opaque.

The lamination process may be performed at several times for the screening layer 117 to effectively screen the glass member 111. The screening layer 117 formed on the rear surface 111b prevents the emission of light from the first and second light emitting parts 17 and 87 to the outside. That is, light emitted from the first and second light emitting parts 17 and 87 is reflected by the screening layer 117. Thus, the light emitted from the first and second light emitting parts 17 and 87 can be transmitted through the region of the deposition treated layer 116 except for the screening layer 117. As described above, since the deposition treated layer 116 has a predetermined color and opacity, the light emitted from the first and second light emitting parts 17 and 87 partially pass through the deposition treated layer 116. Accordingly, soft light without glare is emitted, and items stored in the refrigerating compartment 30, that is, in the first receiving part 70 and the sub-door 80 can be seen from the outside. In this case, the viewing window 105 for showing the inside of the refrigerating compartment 30 may correspond to the region of the deposition treated layer 116. As a result, a user can perceive the positions of the items visually in comfort.

An operation of a refrigerator will now be described according to the first embodiment.

The light emitting manipulator 90, *provided at the screening layer 117,* may be pressed to perceive items stored in the refrigerating compartment 30, that is, in the first receiving part 70 and the second receiving part of the sub-door 80.

Then, the first light emitting part 17 and the second light emitting part 87 may be turned on, and light emitted therefrom is transmitted by the inner door part 150 and the outer door part 110 which are formed of transparent materials, and is emitted to the outside.

At this point, since the deposition treated layer 116 and the lamination treated layer 112, which have predetermined colors and opacity, are disposed on the outer door part 110, a portion of the light emitted from the first and second light emitting parts 17 and 87 is reflected from the outer door part 110, and the other thereof is transmitted by the viewing window 105, and thus, is softly emitted to the outside. At this point, the items stored in the first receiving part 70 and the sub-door 80 can be perceived from the outside. After a predetermined time is elapsed, the first light emitting part 17 and the second light emitting part 87 may be turned off, thereby reducing the power consumption thereof.

Although the viewing window 105 is provided to the first refrigerating compartment door 100 in the current embodiment, the viewing window 105 may be provided to one of the first and second freezing compartment doors 21 and 22 according to another embodiment. In addition, an item stored in the freezing compartment 20 can be perceived from the outside.

Hereinafter, a description will be made according to a second embodiment. Since the current embodiment is the same as the first embodiment except for a disposition of a storage compartment, different parts between the first and second embodiments will be described principally, and a description of the same parts will be omitted, and like reference numerals denote like elements throughout.

FIG. 11 is a perspective view illustrating a configuration of a refrigerator according to the second embodiment. FIG. 12 is a perspective view illustrating a configuration of a refrigerator according to a third embodiment.

Referring to FIG. 11, a refrigerator 200 according to the second embodiment includes a main body 210 defining a storage compartment, and doors 220 and 230 closing the storage compartment.

The storage compartment includes a refrigerating compartment for storing an item under refrigeration, and a freezing compartment for storing an item under freezing. The doors 220 and 230 include refrigerating compartment doors (also denoted by 220) rotatably coupled to the front portion of the refrigerating compartment, and a freezing compartment door (also denoted by 230) closing the front portion of the freezing compartment.

The refrigerator 200 is a bottom freezer type refrigerator in which a refrigerating compartment is disposed over a freezing compartment.

The refrigerating compartment door 220 is provided with a viewing window 225 to perceive a receiving part 227 provided to the refrigerating compartment, from the outside of the refrigerator 200. Since the viewing window 225 is the some in configuration as the viewing window 105, a description thereof will be omitted.

The lower portion of the refrigerating compartment door 220 is provided with a light emitting manipulator 250 that is manipulated to operate a light emitting part disposed in the refrigerating compartment. Although not shown, the light emitting part is disposed in the refrigerating compartment to emit light to an item stored in the receiving part 227.

According to the configuration as described above, an item disposed in the refrigerating compartment can be perceived through the viewing window 225 by manipulating the light emitting manipulator 250 without opening the refrigerating compartment door 220.

Referring to FIG. 12, a refrigerator 300 according to the third embodiment includes a main body 310 defining a storage compartment, and doors 320 and 330 closing the storage compartment.

The storage compartment includes a refrigerating compartment for storing an item under refrigeration, and a freezing compartment for storing an item under freezing. The doors 320 and 330 include a refrigerating compartment door (also denoted by 320) and a freezing compartment door (also denoted by 330), which are rotatably coupled to the front portions of the refrigerating compartment and the freezing compartment, respectively.

The refrigerator 300 is a side by side type refrigerator in which a refrigerating compartment and a freezing compartment are disposed on the left and right sides.

The refrigerating compartment door 320 is provided with a viewing window 325 to perceive a receiving part 327 provided to the refrigerating compartment, from the outside of the refrigerator 300. Since the viewing window 325 is the some in configuration as the viewing window 105, a description thereof will be omitted.

The freezing compartment door 330 is provided with a light emitting manipulator 350 that can be manipulated to operate a light emitting part disposed in the refrigerating compartment. A display unit 340 for displaying an operation state of the refrigerator 300, an input part 342 for inputting a predetermined command for operating the refrigerator 300 are disposed at a side of the light emitting manipulator 350.

According to the configuration as described above, an item disposed in the refrigerating compartment can be perceived through the viewing window 325 by manipulating the light emitting manipulator 350 without opening the refrigerating compartment door 320.

Although the viewing window 325 is provided to the refrigerating compartment door 320 according to the current embodiment, the viewing window 325 may be provided to the freezing compartment door 330 according to another embodiment. In this case, an item disposed in the freezing compartment can be perceived from the outside without opening the freezing compartment door 330. In this case, the light emitting manipulator 350 may be provided to the refrigerating compartment door 320.

FIG. 13 is a perspective view illustrating a refrigerator according to a fourth embodiment. FIGS. 14 and 15 are cross-sectional views illustrating a driving unit for driving a display unit of a refrigerator according to the fourth embodiment. FIG. 16 is a perspective view illustrating an operation of a viewing window of the refrigerator according to the fourth embodiment.

Hereinafter, a description of the same components as those of FIGS. 1 to 12 will be omitted.

Referring to FIGS. 13 to 16, the first refrigerating compartment door 100 according to an embodiment includes the display unit 50 for displaying an operation state of a refrigerator, the light emitting manipulator 90 for manipulating the first and second light emitting parts 17 and 87 and the display unit 50, and input parts 92 for commanding the refrigerator to operate.

In detail, the display unit 50 may be disposed in a region corresponding to the viewing window 105. When the first and second light emitting parts 17 and 87 are turned off, the display unit 50 is displayed to the outside of the refrigerator, and it is difficult to see the inside of the refrigerating compartment 30.

The input part 92 is manipulated to input a command for operating the refrigerator, for example, a command for controlling a temperature of the freezing compartment 20 and a temperature of the refrigerating compartment 30, and a command for operating a special refrigerating compartment.

When the light emitting manipulator 90 is manipulated, the display unit 50 or the first and second light emitting parts 17 and 87 may be selectively turned on or off. An operation (control) method related with these on/off operations will be described later with reference to drawings.

The rear surface of the first refrigerating compartment door 100 is provided with a driving unit 400 for driving the display unit 50. The driving unit 400 may be disposed in the insulating space 135.

In detail, the driving unit 400 includes: an upper plate 420 and a lower plate 460, which spaced apart from each other and are vertically arrayed; a first transparent conductor 430 disposed under the upper plate 420 a second transparent conductor 450 disposed over the lower plate 460; and a liquid crystal layer 440 disposed between the first and second transparent conductors 430 and 450. The upper plate 420 and the lower plate 460 may be formed of transparent glass or plastic, which fully transmit light.

The first and second transparent conductors 430 and 450 are transparent electrodes for driving the liquid crystal layer 440, and may be formed of indium tin oxide (ITO). The first and second transparent conductors 430 and 450 may have predetermined conductivity and transmissivity.

The first and second transparent conductors 430 and 450 may be driven as positive and negative electrodes by power supplied from a power supply 490, and thus, an alignment of the liquid crystal layer 440 is determined in a predetermined direction according to the driving of the first and second transparent conductors 430 and 450.

The first and second transparent conductors 430 and 450 may constitute one of pixels including a plurality of electrodes. When power is applied to a part of the electrodes, an alignment of the liquid crystal layer 440 corresponding to the part of the electrodes is determined in a predetermined direction.

A character or a numeral displayed on the display unit 50 is expressed in a specific shape by the driving of the first and second transparent conductors 430 and 450 constituted in a pixel unit, and the driving of the liquid crystal layer 440 corresponding to the first and second transparent conductors 430 and 450. A vibration direction of light may be determined according to an alignment degree of the liquid crystal layer 440, for example, according to an alignment angle from a vertical axis.

A first polarizing plate 412 is disposed over the upper plate 420, and a second polarizing plate 414 is disposed under the lower plate 460, and uses polarization as a property of light to transmit light having only a predetermined direction. For example, light passing through the first polarizing plate 412 may be polarized vertically with respect to an optical axis, and light passing through the second polarizing plate 414 may be polarized horizontally with respect to the optical axis. The liquid crystal layer 440, the first and second transparent conductors 430 and 450, the first and second polarizing plates 212 and 214, and the upper and lower plates 420 and 460 may constitute an LCD panel.

Backlights 480 for emitting light and a light guide panel 470 are disposed under the second polarizing plate 414. The light guide panel 470 is disposed between the backlights 480 to guide light emitted from the back light units 480 to the LCD panel, that is, to the liquid crystal layer 440. The backlights 480 and the light guide panel 470 may constitute a backlight unit.

An operation of the driving unit 400 will now be described.

When the backlights 480 emit light, the light guide panel 470 uniformly transmits the light to the liquid crystal layer 440. The light transmitted by the light guide panel 470 is filtered by the second polarizing plate 414, so that only light having a first direction passes through the second polarizing plate 414. The light passing through the second polarizing plate 414 is transmitted to the liquid crystal layer 440 through the lower plate 460. At this point, the liquid crystal layer 440 is driven by the first and second transparent conductors 430 and 450, and an alignment thereof is determined in a preset direction. The light passing through the liquid crystal layer 440 may change its direction to a direction different from the first direction.

Then, the light is transmitted from the liquid crystal layer 440 to the upper plate 420 and the first polarizing plate 412. At this point, only light having a second direction passes through the first polarizing plate 412. When a vibration direction of the light passing through the liquid crystal layer 440 is the same as the second direction of the first polarizing plate 412, the light entirely passes through the first polarizing plate 412, and thus, a white color can be seen. On the contrary, when a vibration direction of the light passing through the liquid crystal layer 440 is perpendicular to the second direction of the first polarizing plate 412, the light is blocked by the first polarizing plate 412, and thus, a black color can be seen. That is, a white or black color can be seen on the display unit 50 according to an alignment of the liquid crystal layer 440 and a vibration direction of light emitted from the backlights 480. Although not shown, a color filter may be disposed on the upper plate 420. In this case, light passing through the upper plate 420 may have a predetermined color.

As a result, a character (numeral) or a figure displayed on the display unit 50 may be formed by driving of the liquid crystal layer 440 and the filtering of light through the first and second polarizing plates 412 and 414.

When power applied to the first and second transparent conductors 430 and 450 is cut off, and the backlights 480 are turned off, light just passes through the driving unit 400. In this case, information (character and figure) to be displayed through the display unit 50 are transparent, and thus, is invisible on the first refrigerating compartment door 100. When the first and second light emitting parts 17 and 87 emit light, the display unit 50 transmits the light to the outside of the first refrigerating compartment door 100. Thus, as illustrated in FIG. 11, the display unit 50 is invisible on the first refrigerating compartment door 100, and items stored in the first receiving part 70 and the sub-door 80 can be seen through the viewing window 105 from the outside.

An operation of a refrigerator will now be described according to an embodiment.

When the first refrigerating compartment door 100 is closed, and the driving unit 400 is driven, the display unit 50 is displayed on the first refrigerating compartment door 100. In this state, the light emitting manipulator 90 may be pressed to perceive items stored in the refrigerating compartment 30, that is, in the first receiving part 70 and the second receiving part (also denoted by 80).

When the light emitting manipulator 90 is pressed, power applied to the power supply 490 and the backlights 480 is cut off, and a numeral and a character displayed on the display unit 50 disappear. At this point, the first and second light emitting parts 17 and 87 may be turned on, and light emitted from the first and second light emitting parts 17 and 87 may be transmitted to the outside by the transparent inner door part 150 and the transparent outer door part 110.

Since the light emitting manipulator 90 may be manipulated to perceive an item in the refrigerating compartment 30, the light emitting manipulator 90 may be called a viewing conversion input switch.

In this case, since the deposition treated layer 116 and the lamination treated layer 112, which have predetermined colors and opacity, are disposed on the outer door part 110, a portion of light emitted from the first and second light emitting parts 17 and 87 is reflected from the outer door part 110, and the other is emitted through the viewing window 105, and thus, soft light is emitted to the outside.

At this point, the items stored in the first receiving part 70 and the sub-door 80 can be perceived from the outside. After a predetermined time is elapsed, the first light emitting part 17 and the second light emitting part 87 may be turned off, thereby reducing the power consumption thereof.

Although the viewing window 105 is provided to the first refrigerating compartment door 100 in the current embodiment, the viewing window 105 may be provided to one of the first and second freezing compartment doors 21 and 22 according to another embodiment. In addition, an item stored in the freezing compartment 20 can be perceived from the outside.

*Referring to FIGS. 1, 6, 11, 12, and 16, each of the baskets are disposed to horizontally traverse and overlap the viewing window and configured to be visible through the viewing window from the outside of the refrigerator.*

FIG. 17 is a block diagram illustrating a configuration of a refrigerator according to an embodiment. FIG. 18 is a flowchart illustrating a method for controlling a refrigerator according to an embodiment.

Referring to FIGS. 17 and 18, the refrigerator 1 according to an embodiment includes the input part 92 for inputting a predetermined command to the display unit 50, the light emitting manipulator 90 for turning the first and second light emitting parts 17 and 87 on to perceive an item stored in the refrigerating compartment 30, and a timer 320 used to count a duration time that the light emitting manipulator 90 is stayed on.

The refrigerator 1 includes the driving unit 400 for driving the display unit 50, the first light emitting part 17 for emitting light to the first receiving part 70, and the second light emitting part 87 for emitting light to the receiving part 80.

In detail, the driving unit 400 includes the power supply 490 for applying power to the first and second transparent conductors 430 and 450, and the backlights 480 disposed behind the liquid crystal layer 440 to emit predetermined light.

The refrigerator 1 includes a control unit 300. The control unit 300 controls the driving unit 400 and the first and second light emitting parts 17 and 87 according to commands input from the input part 92 and the light emitting manipulator 90.

Referring to FIG. 18, a method for controlling a refrigerator will now be described according to the current embodiment.

When the first refrigerating compartment door 100 is closed in operation S11, the display unit 50 is turned on to display an operation state of a refrigerator on the front side of the viewing window 105. The display unit 50 may be turned on even when the first refrigerating compartment door 100 is opened, in detail, when the driving unit 400 is driven to apply power to the power supply 490, and the backlights 480 emit light to the light guide panel 470, the display unit 50 is turned on in operation S12.

In this state, it is determined in operation S13 whether a command is input through the light emitting manipulator 90. If a command is input through the light emitting manipulator 90, the display unit 50 is turned off in operation S14, and the first and second light emitting parts 17 and 87 are turned on in operation S15. While the display unit 50 is turned off, the LCD panel and the backlight unit are stopped.

Light emitted from the first and second light emitting parts 17 and 87 passes through the driving unit 400, the display unit 50, and the viewing window 105, and is emitted to the outside. At this point, the items stored in the first and second receiving parts 70 and 80 can be shown to the outside in operation S16.

If a command is not input through the light emitting manipulator 90, operation S12 is repeated. That is, the display unit 50 stays on.

When the first and second light emitting parts 17 and 87 stay on, it is determined in operation S17 whether a set time is elapsed. An on-time of the first and second light emitting parts 17 and 87, that is, a time that light is transmitted from the first and second light emitting parts 17 and 87 to the outside is measured by the timer 320, and the control unit 300 determines whether the time measured by the [tinier] *timer* 320 is over the set time.

If the time measured by the [tinier] *timer* 320 is over the set time, the first and second light emitting parts 17 and 87 are turned off in operation S18. Then, the driving unit 400 is operated again to turn the display unit 50 on in operation S19. That is, power is applied to the power supply 490 to drive the first and second transparent conductors 430 and 450 and the liquid crystal layer 440, and light is emitted from the backlights 480 to the liquid crystal layer 440.

On the contrary, the time measured by the timer 320 is not over the set time, the items are continually shown to the outside.

As such, when the display unit 50 is displayed on the first refrigerating compartment door 100 in a normal state, an operation state of the refrigerator 1 can be checked. In addition, when the light emitting manipulator 90 is manipulated to perceive an item in the refrigerator 1, the display unit 50 disappears, and the first and second light emitting parts 17 and 87 are operated.

Accordingly, the refrigerator 1 can be conveniently used, thereby satisfying users.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. For example, a lining layer having high coefficient of friction may be attached to a wheel of an auxiliary wheel to prevent a slip, or a rough surface such as knurling may be provided thereto, or a plurality of wheels may be combined.

What is claimed is:

1. A refrigerator, comprising:

a cabinet defining a first storage area and a second storage area therein, the first storage area provided at a lateral side of the second storage area, the refrigerator configured to maintain the first storage area at a first operating temperature and the second storage area at a second operating temperature that is higher than the first operating temperature;

a first door configured to open and close the first storage area;

a second door configured to open and close the second storage area[, and having an opening formed therein];

a door basket to define a door storage and provided behind a rear surface of the second door;

a light unit provided on an inner side of the cabinet [and configured to emit light toward the door storage]; *and* a glass assembly [configured to cover the opening] *that defines a front surface* of the second door and through which the door storage is viewable, wherein the glass assembly comprises:

a front panel formed of a *first* transparent material [and configured to cover the opening of the second door;], *wherein the front panel has an outer region that is provided around a boundary of the front panel to define therein a viewing window having a first color and a first opacity to partially transmit the light from the light unit to an outside of the refrigerator at a reduced intensity, the outer region having a second opacity that is more opaque than the first opacity of the viewing window and being configured to block the light emitted from the light unit,* and a rear panel provided behind the front panel and formed of a *second* transparent material, the rear panel being spaced apart from the front panel such that an insulating space is defined between the front panel and the rear panel, [wherein the front panel includes a first region configured to cover an entirety of a viewing region of the glass assembly, the first region has a first color and a first opacity to partially block the light emitted from the light unit and to transmit a reduced intensity of the light to an outside of the refrigerator.]

wherein the door basket is disposed to horizontally traverse and overlap the [opening of the second door] *viewing window* to be visible through the [opening] *viewing window* from the outside of the refrigerator, wherein, in a first state in which the light unit is turned on, the light from the light unit is emitted through the [first region] *viewing window*, and the door basket is visible through the viewing [region] *window*, wherein the light unit is turned off after being turned on a predetermined period of time, and wherein, in a second state in which the light unit is turned off, the door basket is less visible through the viewing [region] *window* as compared to the first state*, and*

*wherein the first transparent material of the front panel extends* (*i*) *from a left edge of the second door to a right*

*edge of the second door and (ii) from a bottom edge of the second door to a top edge of the second door.*

[2. The refrigerator of claim 1, wherein the front panel further comprises a second region provided along a circumference of the front panel and defining the viewing region therein, the second region having a second opacity that is more opaque than the first opacity of the first region, and configured to block the light emitted from the light unit.]

3. The refrigerator of claim 1, wherein, *in* the second state in which the light unit is turned off, the [first region causes the viewing region to become] *viewing window becomes* darker than in the first state such that the door basket is less visible through the viewing [region] *window* as compared to the first state.

4. The refrigerator of claim 1, wherein the second storage area of the cabinet comprises a receiving part configured to receive food, and wherein the light unit is disposed in front of the receiving part of the second storage area.

5. The refrigerator of claim 1, wherein the light unit is arranged along a circumference of a front end of the second storage area of the cabinet.

[6. The refrigerator of claim 1, wherein the light unit is disposed to face the door storage at a left side and a right side of the door storage.]

[7. The refrigerator of claim 1, wherein the opening of the second door consists of a single opening, and wherein the door storage is disposed such that at least one of (i) a bottom portion of the door basket is arranged lower than a top of the single opening, or (ii) a top portion of the door basket is arranged higher than a bottom of the single opening.]

8. A refrigerator, comprising:

a cabinet defining a storage area;

a first door configured to open and close *at least a portion of* the storage area and including a frame [in which a first opening is formed];

*a door basket provided at the frame to define a door storage;* a second door configured to open and close the [first opening] *door storage* of the first door, [the second door having a second opening defined therethrough that is communicative with the first opening] *the door basket being provided behind the second door*;

[a door basket to define a door storage and provided behind the second door;]

a light unit provided [in the frame of the first door] *at the cabinet* and configured to emit light toward the door storage;

a glass assembly that defines a front surface of the second door and [that covers the second opening defined through the second door and] through which the door storage is viewable, wherein the glass assembly comprises:

a front panel formed of a *first* transparent material [and configured to cover the opening of the second door], *wherein the front panel has an outer region that is provided around a boundary of the front panel to define therein a viewing window having a first color and a first opacity to partially transmit the light from the light unit to an outside of the refrigerator at a reduced intensity, the outer region having a second opacity that is more opaque than the first opacity of the viewing window and being configured to block the light emitted from the light unit*; and a rear panel provided behind the front panel and formed of a *second* transparent material, the rear panel being spaced apart from the front panel such that an insulating space is defined between the front panel and the rear panel[, wherein the front panel includes a first region configured to cover an entirety of a viewing region of the glass assembly, the first region has a first color and a first opacity to partially block the light emitted from the light unit and to transmit a reduced intensity of the light to an outside of the refrigerator], wherein the door basket is disposed to horizontally traverse and overlap the [opening of the second door] *viewing window* to be visible through the [opening] *viewing window* from the outside of the refrigerator, wherein, in a first state in which the light unit is turned on, the light from the light unit is emitted through the [first region] *viewing window*, and the door [storage] *basket* is visible through the viewing [region] *window*, wherein the light unit is turned off after being turned on a predetermined period of time, and wherein, in a second state in which the light unit is turned off, the door [storage] *basket* is less visible through the viewing [region] *window* as compared to the first state.

9. The refrigerator of claim 8, further comprising a second light unit disposed [on the cabinet] *at the frame of the first door*.

[10. The refrigerator of claim 9, wherein the second light unit emits light to the door storage at a rear side of the light unit.]

[11. The refrigerator of claim 9, wherein the light unit is closer to the front panel than the second light unit.]

[12. The refrigerator of claim 8, wherein the light unit extends along a vertical longitudinal direction of the first opening.]

[13. The refrigerator of claim 8, wherein the light unit is provided at a front portion of the inner side of the cabinet.]

[14. The refrigerator of claim 8, wherein the front panel further comprises a second region provided along a circumference of the front panel and defining the viewing region therein, the second region having a second opacity that is more opaque than the first opacity of the first region, and configured to block the light emitted from the light unit.]

15. A refrigerator, comprising:

a cabinet defining a first storage area and a second storage area therein, the first storage area provided at a lower side of the second storage area, the refrigerator configured to maintain the first storage area at a first operating temperature and the second storage area at a second operating temperature that is higher than the first operating temperature;

a first door configured to open and close a first portion of the second storage area;

a second door configured to open and close a second portion of the second storage area[, the second door having an opening formed therein];

a door basket to define a door storage and provided behind a rear surface of the second door;

a light unit provided on an inner side of the cabinet [and configured to emit light toward the door storage of the second door]; *and* a glass assembly [configured to cover the opening] *that defines a front surface* of the second door and through which the door basket is viewable, wherein the glass assembly comprises:

a front panel formed of a *first* transparent material [and configured to cover the opening of the second door;], *wherein the front panel has an outer region that is provided around a boundary of the front panel to define therein a viewing window having a first color and a first opacity to partially transmit the light from*

*the light unit to an outside of the refrigerator at a reduced intensity, the outer region having a second opacity that is more opaque than the first opacity of the viewing window and being configured to block the light emitted from the light unit,* and a rear panel provided behind the front panel and formed of a *second* transparent material, the rear panel being spaced apart from the front panel such that an insulating space is defined between the front panel and the rear panel, [wherein the front panel includes a first region configured to cover an entirety of a viewing region of the glass assembly, the first region has a first color and a first opacity to partially block the light emitted from the light unit and to transmit a reduced intensity of the light to an outside of the refrigerator,] wherein the door basket is disposed to horizontally traverse and overlap the opening of the second door to be visible through the opening from the outside of the refrigerator, wherein, in a first state in which the light unit is turned on, the light from the light unit is emitted through the [first region] *viewing window*, and the door storage is visible through the viewing [region] *window*, wherein the light unit is turned off after being turned on a predetermined period of time, and wherein, in a second state in which the light unit is turned off, the door storage is less visible through the viewing [region] *window* as compared to the first state,

*wherein the first transparent material of the front panel extends (i) from a left edge of the second door to a right edge of the second door and (ii) from a bottom edge of the second door to a top edge of the second door.*

*16. The refrigerator of claim 15, wherein a door handle is provided behind the front panel, the door handle including an upward recess that is defined behind the front panel at a bottom surface of the second door.*

*17. A refrigerator, comprising:*

*a main body defining a food storage compartment therein;*

*a light emitting part configured to emit light toward the food storage compartment; and*

*a door configured to open and close at least a portion of the food storage compartment, the door including:*

*an outer door part made of a first transparent material, wherein the outer door part has an outer region that is provided around a boundary of the outer door part to define therein a viewing window having a first color and a first opacity to partially transmit the light from the light emitting part to an outside of the refrigerator at a reduced intensity, the outer region having a second opacity that is more opaque than the first opacity of the viewing window and being configured to block the light emitted from the light emitting part, and*

*an inner door part made of a second transparent material and spaced apart from the outer door part, an insulating space being defined between the outer door part and the inner door part,*

*wherein a receiving basket is provided to horizontally traverse and overlap the viewing window and to be visible through the viewing window from the outside of the refrigerator,*

*wherein the viewing window is configured, in a first state in which the light emitting part is turned on, to emit therethrough the light from the light emitting part such that the receiving basket is visible from the outside of the refrigerator through the viewing window,*

*wherein the viewing window is configured, in a second state in which the light emitting part is turned off, to emit therethrough less light than in the first state such that the receiving basket is less visible through the viewing window as compared to the first state, and*

*wherein the first transparent material of the outer door part extends (i) from a left edge of the door to a right edge of the door and (ii) from a bottom edge of the door to a top edge of the door.*

*18. The refrigerator of claim 17, wherein a plurality of receiving baskets are provided at the door, and*

*wherein the plurality of receiving baskets are configured to horizontally traverse and overlap the viewing window and to be visible through the viewing window from the outside of the refrigerator.*

*19. The refrigerator of claim 18, further comprising a manipulator that is configured to, based on user input, turn on the light emitting part, the manipulator being provided at the outer region of the outer door part.*

*20. The refrigerator of claim 17, wherein the light emitting part is provided at the food storage compartment.*

*21. The refrigerator of claim 17, wherein the light emitting part is provided at the door.*

*22. The refrigerator of claim 17, wherein the food storage compartment is a refrigerating compartment,*

*wherein a freezing compartment is provided adjacent to the refrigerating compartment, and*

*wherein the door is configured to open and close the refrigerating compartment.*

*23. The refrigerator of claim 17, wherein the food storage compartment is a refrigerating compartment, and*

*wherein a freezing compartment is provided below the refrigerating compartment.*

*24. The refrigerator of claim 17, wherein the refrigerator is configured to transition from the first state to the second state after a predetermined period of time.*

*25. The refrigerator of claim 17, further comprising an additional door that is coupled to the door and that is configured to open and close the food storage compartment, wherein the additional door is configured, based on the door being closed, to be positioned between door and the food storage compartment.*

*26. The refrigerator of claim 25, wherein the receiving basket is attached to the additional door.*

*27. The refrigerator of claim 17, wherein the outer door part includes one or more lamination layers that are provided at an outer surface of the outer door part and that are configured to provide the first color and the first opacity to the viewing window.*

*28. The refrigerator of claim 17, wherein a door handle is provided behind the outer door part, the door handle including an upward recess that is defined behind the outer door part at a bottom surface of the door.*

*29. The refrigerator of claim 17, wherein the viewing window is configured, in the second state in which the light emitting part is turned off, to become less visible.*

*30. The refrigerator of claim 17, wherein the door body is provided between the outer door part and the inner door part.*

*31. The refrigerator of claim 17, wherein the insulating space contains an insulating gas or is in vacuum.*

*32. The refrigerator of claim 17, wherein a sealing element is provided to seal the insulating space.*

*33. A refrigerator, comprising:*

*a main body defining a food storage compartment therein;*

*a light emitting part configured to emit light toward the food storage compartment;*

*a sub-door rotatably coupled to the main body;*

*a receiving basket provided at the sub-door; and*

*a compartment door rotatably coupled to the sub-door or to the main body, the compartment door comprising:*

*an outer door part made of a first transparent material, wherein the outer door part has an outer region that is provided around a boundary of the outer door part to define therein a viewing window having a first color and a first opacity to partially transmit the light from the light emitting part to an outside of the refrigerator at a reduced intensity, the outer region having a second opacity that is more opaque than the first opacity of the viewing window and being configured to block the light emitted from the light emitting part, and*

*an inner door part made of a second transparent material and spaced apart from the outer door part,*

*wherein the receiving basket is disposed to horizontally traverse and overlap the viewing window and is configured to be visible through the viewing window from the outside of the refrigerator,*

*wherein the viewing window is configured, in a first state in which the light emitting part is turned on, to emit therethrough the light from the light emitting part such that the receiving basket is visible from the outside of the refrigerator through the viewing window, and*

*wherein the viewing window is configured, in a second state in which the light emitting part is turned off, to emit therethrough less light than in the first state such that the receiving basket is less visible through the viewing window as compared to the first state.*

*34. The refrigerator of claim 33, wherein a plurality of receiving baskets are provided at the sub-door, and*

*wherein each of the plurality of receiving baskets is configured to horizontally traverse and overlap the viewing window and to be visible through the viewing window from the outside of the refrigerator.*

*35. The refrigerator of claim 33, wherein the light emitting part is provided at the main body.*

*36. The refrigerator of claim 35, further comprising a manipulator that is configured to, based on user input, turn on the first light emitting part and the second light emitting part together.*

*37. The refrigerator of claim 33, wherein the food storage compartment is a refrigerating compartment,*

*wherein a freezing compartment is provided adjacent to the refrigerating compartment, and*

*wherein the sub-door is configured to open and close the refrigerating compartment.*

*38. The refrigerator of claim 33, wherein the food storage compartment is a refrigerating compartment, and*

*wherein a freezing compartment is provided below the refrigerating compartment.*

*39. The refrigerator of claim 33, wherein the refrigerator is configured to transition from the first state to the second state after a predetermined period of time.*

*40. The refrigerator of claim 36, wherein the manipulator is provided at the outer region.*

*41. The refrigerator of claim 33, wherein the viewing window is configured, in the second state in which the light emitting part is turned off, to disappear.*

*42. The refrigerator of claim 33, wherein the outer door part includes one or more lamination layers that are provided at an outer surface of the outer door part and that are configured to provide the first color and the first opacity to the viewing window.*

*43. The refrigerator of claim 33, wherein a door handle is provided behind the outer door part, the door handle including an upward recess that is defined behind the outer door part at a bottom surface of the compartment door.*

*44. The refrigerator of claim 43, wherein the sub-door includes a sub-door handle that protrudes from a front surface of the sub-door, the sub-door including a recess part that is recessed upward from a bottom surface of the sub-door handle, and*

*wherein the sub-door handle is configured, based on the compartment door being closed, to be covered by the door handle.*

*45. The refrigerator of claim 44, wherein, based on the sub-door and the compartment door being closed, pulling out the sub-door handle simultaneously opens the sub-door and the compartment door.*

*46. The refrigerator of claim 44, wherein the sub-door handle has a shape that corresponds to the door handle.*

*47. The refrigerator of claim 33, wherein the first transparent material of the outer door part extends (i) from a left edge of the compartment door to a right edge of the compartment door and (ii) from a bottom edge of the compartment door to a top edge of the compartment door.*

*48. The refrigerator of claim 33, wherein an insulating space is defined within the door body and sealed by the outer door part and the inner door part.*

*49. The refrigerator of claim 48, wherein the insulating space contains an insulating gas or is in vacuum.*

*50. The refrigerator of claim 48, wherein a sealing element is provided to seal the insulating space.*

*51. The refrigerator of claim 1, wherein a door handle is provided behind the front panel, the door handle including an upward recess that is defined behind the front panel at a bottom surface of the second door.*

*52. The refrigerator of claim 8, wherein a door handle is provided behind the front panel, the door handle including an upward recess that is defined behind the front panel at a bottom surface of the second door.*

*53. The refrigerator of claim 52, wherein the first door includes a sub-door handle that protrudes from a front surface of the first door, the sub-door including a recess part that is recessed upward from a bottom surface of the sub-door handle, and*

*wherein the sub-door handle is configured, based on the second door being closed, to be covered by the door handle.*

*54. The refrigerator of claim 53, wherein, based on the first and second door being closed, pulling out the sub-door handle simultaneously opens the first and second doors.*

*55. The refrigerator of claim 53, wherein the sub-door handle has a shape that corresponds to the door handle.*

*56. A refrigerator, comprising:*

*a main body defining a food storage compartment therein;*

*a light emitting part configured to emit light toward the food storage compartment;*

*a sub-door rotatably coupled to the main body;*

*a receiving basket provided at the sub-door; and*

*a compartment door rotatably coupled to the sub-door or to the main body, the compartment door comprising:*

*an outer door part made of a first transparent material, wherein the outer door part has an outer region that is provided around a boundary of the outer door part to define therein a viewing window having a first color and a first opacity to partially transmit the light from the light emitting part to an outside of the refrigerator at a reduced intensity, the outer region having a second opacity that is more opaque than the*

*first opacity of the viewing window and being configured to block the light emitted from the light emitting part,*

*an inner door part made of a second transparent material and spaced apart from the outer door part,*

*an insulating space defined between the outer door part and the inner door part, and*

*a door handle including an upward recess that is defined behind the front panel at a bottom surface of the second door,*

*wherein the receiving basket is disposed to horizontally traverse and overlap the viewing window and is configured to be visible through the viewing window from the outside of the refrigerator,*

*wherein the sub-door includes a sub-door handle that protrudes from a front surface of the sub-door, the sub-door including a recess part that is recessed upward from a bottom surface of the sub-door handle, and*

*wherein the sub-door handle is configured, based on the compartment door being closed, to be covered by the door handle.*

*57. The refrigerator of claim 56, wherein the outer door part extends (i) from a left edge of the compartment door to a right edge of the compartment door and (ii) from a bottom edge of the compartment door to a top edge of the compartment door.*

*58. The refrigerator of claim 56, wherein, based on the sub-door and the compartment door being closed, pulling out the sub-door handle simultaneously opens the sub-door and the compartment door.*

*59. The refrigerator of claim 56, wherein the sub-door handle has a shape that corresponds to the door handle.*

* * * * *